June 12, 1951  F. B. HEMMERT  2,556,274
WHEELED SPIKE TOOTH HARROW
Filed Feb. 24, 1947  3 Sheets-Sheet 1
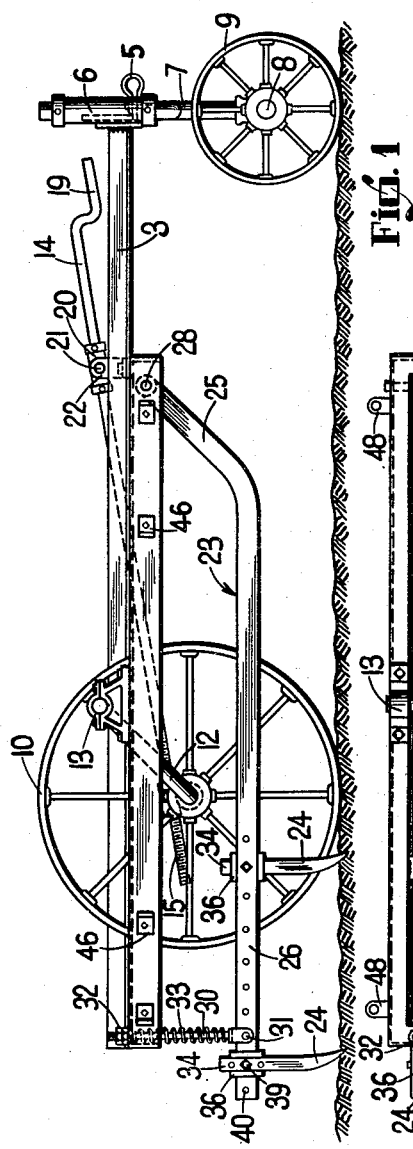
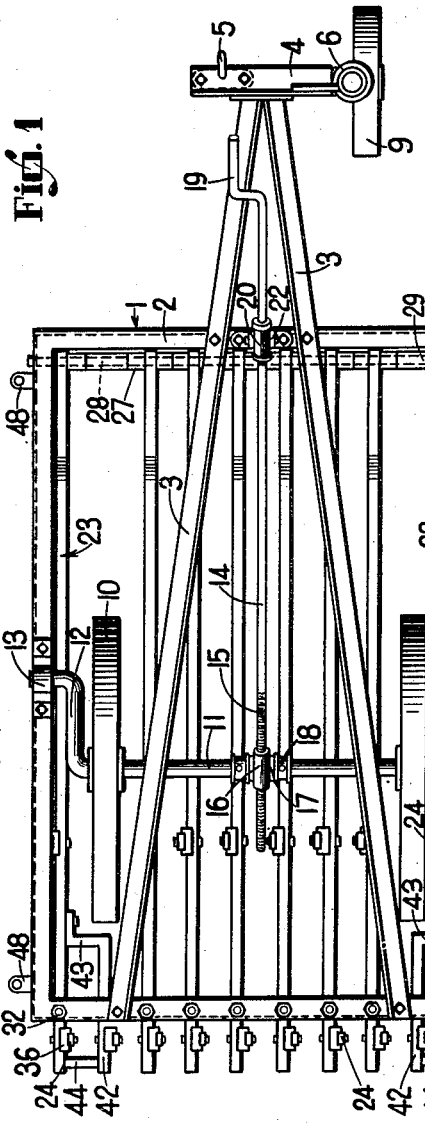
INVENTOR.
Frank B. Hemmert.
BY
Corbett, Mohney & Miller
ATTORNEYS June 12, 1951 — F. B. HEMMERT — 2,556,274
WHEELED SPIKE TOOTH HARROW
Filed Feb. 24, 1947 — 3 Sheets-Sheet 2
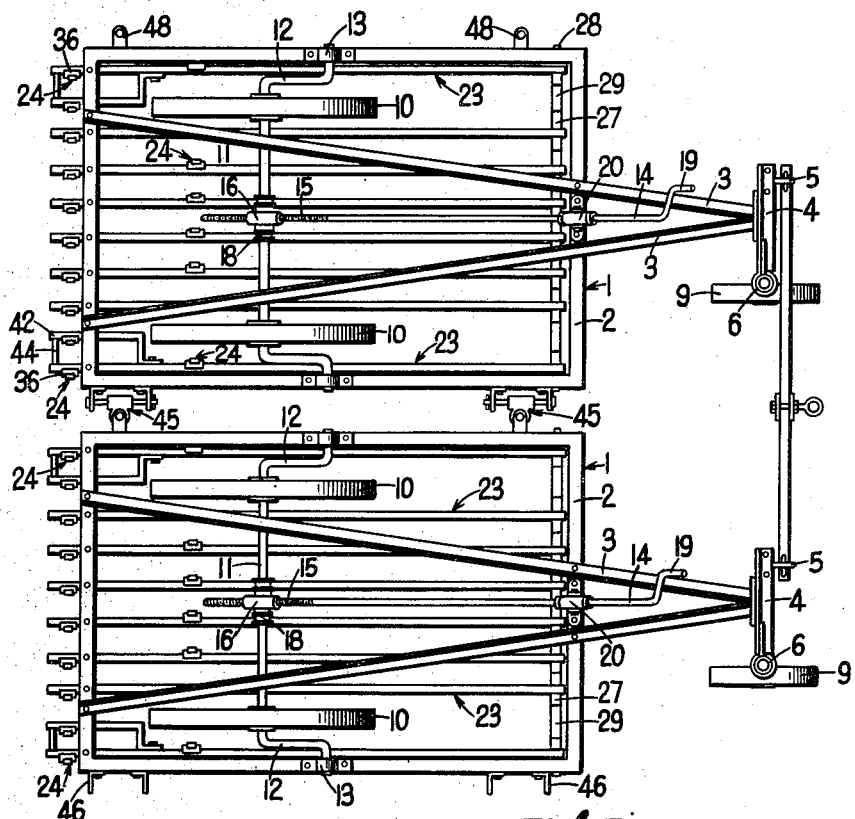
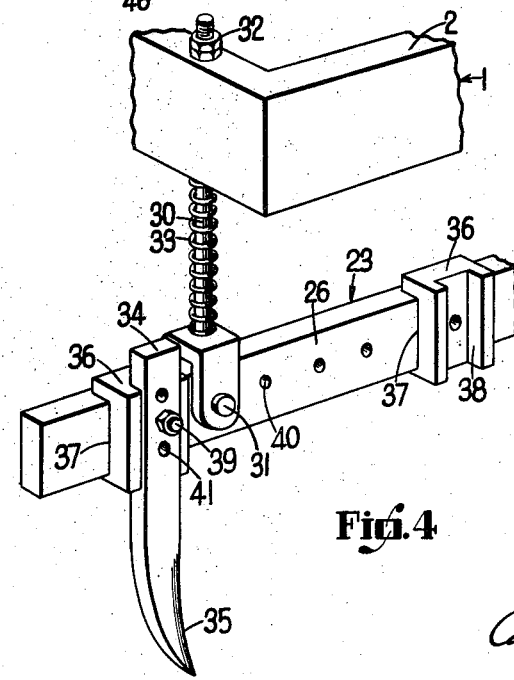
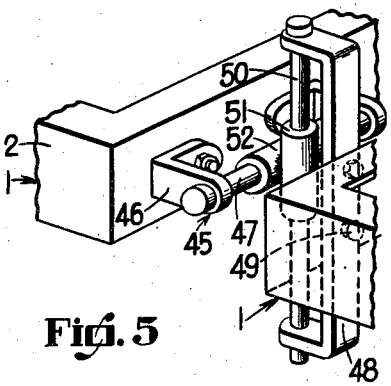
INVENTOR.
Frank B. Hemmert
BY
ATTORNEYS June 12, 1951  F. B. HEMMERT  2,556,274
WHEELED SPIKE TOOTH HARROW
Filed Feb. 24, 1947  3 Sheets-Sheet 3
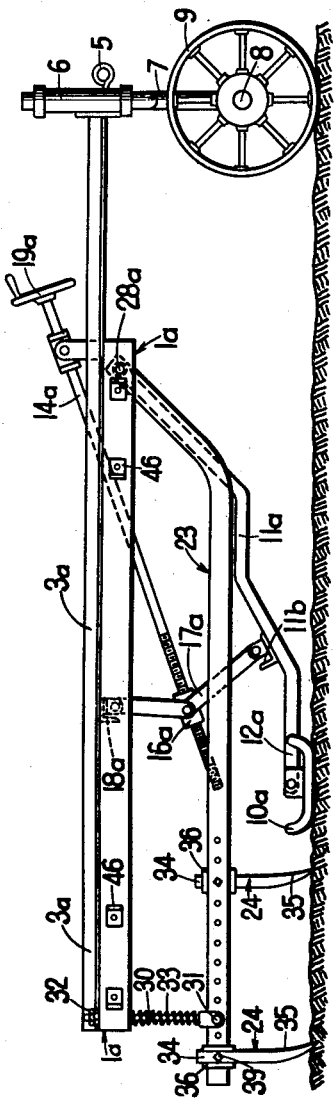
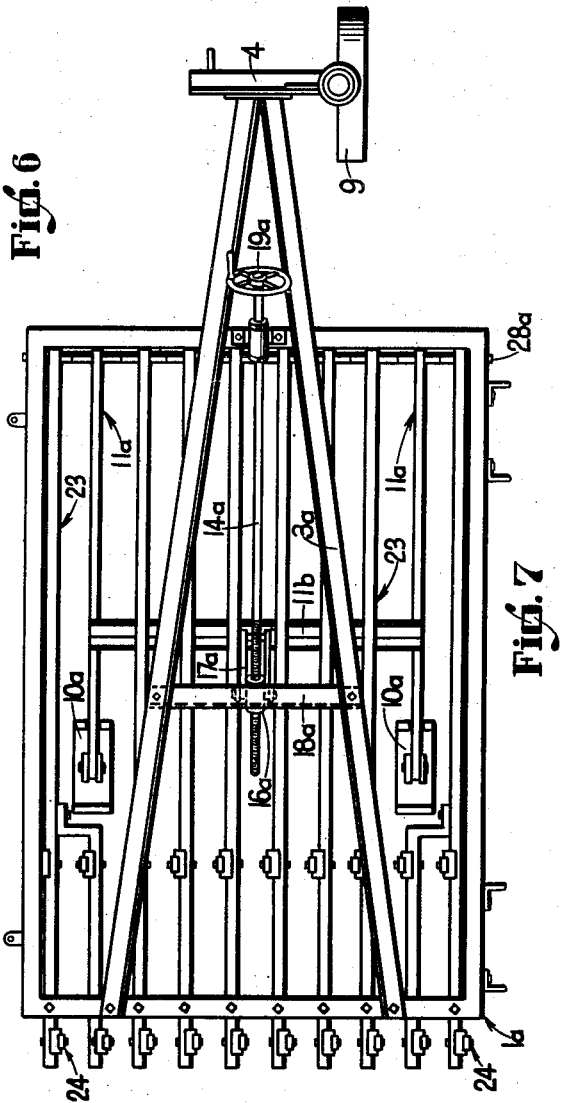
INVENTOR.
Frank B. Hemmert,
BY
Corbett, Mahoney & Miller
ATTORNEYS

Patented June 12, 1951

2,556,274

UNITED STATES PATENT OFFICE 2,556,274

WHEELED SPIKE-TOOTH HARROW

Frank B. Hemmert, Wapakoneta, Ohio

Application February 24, 1947, Serial No. 730,409

2 Claims. (Cl. 55—19)

My invention relates to a wheeled spike tooth harrow. It has to do, more particularly, with a farming implement of the tooth harrow type.

One of the objects of my invention is to provide a farming implement of the type indicated which is of simple and low cost structure but which can be used very effectively.

Another object of my invention is to provide a farming implement of the type indicated wherein the main frame is carried by traction wheels or traction shoes in such a manner that the traction members and frame can be adjusted quickly and easily relative to each other to readily vary the depth of cut of the harrow teeth which are suitably carried by the frame.

Another object of my invention is to provide a farming implement of the type indicated above wherein a plurality of gangs of harrow teeth are provided, each gang being supported on an independent arm which is carried by the frame for vertical movement, resilient means being provided for urging each arm downwardly to thereby urge the harrow teeth into the ground.

Still another object of my invention is to provide a farming implement of the type indicated above wherein the harrow teeth are attached to the supporting arms in such a manner that they may be adjusted to different positions thereon longitudinally of the arms, which will be forwardly and rearwardly of the entire implement, and which will be secured in the desired position rigidly without danger of tilting or rocking movement during the time the teeth are being dragged through the earth.

A further object of my invention is to provide a farming implement of the type indicated which is constructed in the form of a unit that can be used alone or in multiples, novel means being provided for attaching such units together in such a manner that proper relative movement therebetween will be permitted.

Various other objects will be apparent.

The preferred embodiment of my invention is illustrated in the accompanying drawings wherein similar characters of reference designate corresponding parts and wherein:

Figure 1 is a side elevational view of a farming implement constructed in accordance with my invention.

Figure 2 is a plan view of the implement.

Figure 3 is a plan view illustrating two of the units of Figure 2 connected together.

Figure 4 is a detail in perspective illustrating the means for mounting the teeth on a supporting arm and the means for urging the arm downwardly.

Figure 5 is a detail in perspective illustrating one of the connections for attaching adjacent units together.

Figure 6 is a side elevational view of an implement constructed according to my invention but having traction shoes rather than traction wheels as the frame supporting means at the rear end of the implement.

Figure 7 is a plan view of the structure shown in Figure 6.

With reference to the drawings, I have illustrated in Figures 1, 2 and 3 a farming implement which comprises a main frame 1 which includes a rectangular horizontally disposed frame section 2 having a pair of angle bars 3 bolted to the upper side thereof. These angle bars 3 diverge at their rear ends and converge at their forward ends which extend forwardly beyond the frame section 2. Welded to the converging ends of members 3 is a horizontally extending rigid arm 4 which extends laterally of the members 3. One end of this arm at one side of the center line of the frame section 2 is provided with a clevis 5 by means of which the unit can be connected to a tractor or other draft means. The other end of the arm 4 at the opposite side of the center line is provided with a vertically disposed bearing sleeve 6. This sleeve 6 receives the upper end of a post 7 which is rotatably disposed therein. The lower end of this post carries an outwardly extending axle 8 upon which the wheel 9 is mounted. Thus, the wheel 9 is free to swivel about the axis of the post 7. Thus, the forward end of the frame is supported by a swiveled steering wheel.

The rear end of the frame 1 is supported by a pair of large traction wheels 10. These wheels 10 are carried adjacent opposite ends of an eccentric axle structure 11. The wheels are disposed within the frame section 2 and are rotatably carried on the main straight section of the axle 11. The ends of the axle are provided with crank arm portions 12 which have their extreme outer ends rotatably mounted in bearing members 13 attached to the upper edges of the side members of frame section 2 substantially midway between the forward and rearward ends thereof. For swinging the axle structure about the axis of bearings 13, I provide a shaft 14 which extends longitudinally of the frame section 2 substantially at the center line thereof. This shaft 14 has a threaded rear end 15 which extends through a threaded sleeve 16 carried by a sleeve 17 which surrounds the axle 11 and is maintained substantially midway between the ends thereof by collars 18 attached to the axle. This shaft extends forwardly beyond the front member of frame section 1 and is provided with an integral crank portion 19 by means of which it may be rotated. The forward portion of the shaft 14 extends through a sleeve 20 which is swiveled for vertical movement by means of a pin 21 to a bracket 22 which is attached to the upper edge of the forward members of section 2. Shaft 14 can rotate in sleeve 20 but cannot move axially thereof. Thus, it will be apparent that rotation of the shaft 14 will produce relative vertical movement of the wheels 10 and frame 1. The rear portion of the frame will move vertically to the greatest extent, the frame pivoting about the axle 8 of the forward wheel 9.

A plurality of supporting arms 23 are provided for supporting the gang of harrow teeth 24. These arms extend longitudinally of the frame 1. Each arm 23 is provided with an upturned forward end 25 and a substantially horizontally disposed main section 26. The upturned end 25 is welded to a sleeve section 27 which is rotatably carried by a transversely extending pivot rod 28. This rod is suitably carried by the frame section 2 at the forward end thereof. The sleeve sections 27 serve to keep the arms 23 laterally spaced. Additional spacer sleeves 29 will be provided adjacent each end of rod 28 to keep the two outermost arms 23 at each side of the frame spaced apart a greater distance so as to prevent interference with the wheels 10. The horizontal sections 26 of the arms 23 extend rearwardly slightly beyond the frame 1. It will be noted that the main parts 26 of the arms will be disposed a substantial distance below the frame section 2 because of the provision of the upturned ends 25.

In order to normally urge the rear end of each of the arms 23 downwardly, I provide resilient or flexible means associated with each arm for urging each arm downwardly independently of the other arms. This means includes a rod 30 having a bifurcated lower end pivotally connected, as at 31, to the arm. The upper end of this rod passes for sliding movement through an opening in the rear member of frame section 2. Lock nuts 32 are threaded on the upper end of rod 30 and serve as stops to prevent pulling of the rod 30 downwardly through the opening in the frame section 2. A compression spring 33 surrounds the rod and is disposed between the frame section and the arm 26. Consequently, with this arrangement each arm 23 will be urged downwardly by the associated spring 30. However, upward yielding movement of the arm 23 will be permitted when necessary, the forward end of the arm pivoting about the axis of the rod 28.

Each of the harrow teeth 24 is in the form of a flat bar 34 which has a forwardly turned tooth end 35. Block members 36 are provided for attaching the teeth to the arm 23. Each block member 36 has one of its faces shaped to form a socket 37 which snugly fits over the bar 23. The other face is provided with a channel 38 which is vertically disposed and which snugly receives the bar 34. A bolt 39 passing through aligning openings in members 34, 36 and 23 will secure all of these members together as shown best in Figure 4. A series of the openings 40 are provided along arm 23 to permit adjustment of block 36 to different positions longitudinally of the arm. Moreover, the bar 34 is provided with a series of vertically spaced openings in its upper end to permit vertical adjustment of the tooth 24 relative to the arm 23. A series of blocks 38 may be disposed on the arm for carrying a series of the teeth.

As previously indicated, a substantial space is provided between the two outermost arms 23 at each side of the frame 1 in order to clear the wheels 10. In order that the gangs of harrow teeth are evenly spaced entirely across the frame, an auxiliary arm 42 is attached to each of the outermost arms 23 at the inner side thereof and at the rear end thereof behind the adjacent wheel 10. Each auxiliary arm is attached to the main arm by laterally extending supports 43 and 44. Thus, the auxiliary arm 42 is rigidly attached to the outermost arm in parallel relationship thereto.

The unit of Figures 1 and 2 may be used alone. However, it may also be used in multiples as indicated in Figure 3 which illustrates, for example only, two of these units. These units are flexibly connected together by the connecting units 45 disposed between the adjacent frame sections 2 at the forward and rearward ends thereof.

As shown in Figure 5, the connecting units comprise a pair of L-shaped clips 46 connected to the side member of one of the frame sections 2. These clips may be removably bolted in place. The outer ends of these clips are provided with openings which receive a pivot pin 47 that will be horizontally disposed. The other adjacent frame section 2 is provided with a vertically disposed U-shaped bracket 48 which is bolted by removable bolts 49 to the side member of the frame section 2. The outwardly extending parts of this bracket 48 are provided with openings through which a removable pin 50 may be passed. Thus, it will be apparent that pin 50 is disposed at right angles to pin 47. A sleeve 51 and a sleeve 52 are welded to each other at right angles. The sleeve 52 is mounted on the pin 47 and the sleeve 51 will receive the pin 50. Both sleeves are slidable on their cooperating pins. Thus, when two of these connections are used to connect together two of my units, limited relative longitudinal movement of the two units will be permitted due to the fact that sleeves 52 will slide on pins 47. This relative movement is desirable, for example, if the teeth of one unit encounter more resistance to movement through the earth than the teeth of the other unit. Furthermore, relative vertical movement of the two units will be permitted to a limited extent since the sleeves 51 are free to slide vertically on the pins 50. This is desirable because the teeth of one unit may encounter stones or other objects which cause vertical movement of such unit and this vertical movement will not produce vertical movement of the other unit.

When the units are used in multiples of two or more, as shown in Figure 3, a transverse bar 50 will be connected to the clevis 5 of each unit and this bar will be used in connecting the implements to the draft means.

Since the arms 23 are independently supported, vertical movement of each arm is permitted without affecting the others in case the gang of teeth 24 carried thereby strike rocks or other hard objects. The wheels 10 will initially be so adjusted that they are at a level slightly above the lower ends of the teeth 24 so that the teeth will enter the earth the proper depth. When transporting the implement to a different location, the wheels may be so adjusted that the lower ends of the teeth will be spaced above the lower edges of the wheels.

In Figures 6 and 7, I have illustrated a somewhat modified arrangement of traction means for the rear end of the frame. In this instance, instead of providing wheels 10, I provide traction shoes 10a. These shoes are pivotally carried on the lower rearward end sections 12a of arms 11a. These arms 11a extend forwardly and upwardly and are pivotally mounted for movement about a rod 28a which is similar to rod 28 of Figure 2. One of these arms 11a and associated shoe 10a is provided at each side of the frame. For vertically adjusting the shoes 10a relative to the frame 1a and the harrow teeth, I provide a shaft 14a similar to the shaft 14. This shaft is provided with a handwheel 19a at its forward end. Its rear end is threaded through a sleeve 16a which is connected by toggle linkage 17a to a bar 18a that extends transversely and is secured to the angle members 3a of the frame. The toggle linkage is also connected to a transverse bar 11b that is rigidly attached to both arms 11a. It will be apparent that rotation of shaft 14a will produce simultaneous swinging of the arms 11a about the rods 28a thereby adjusting the shoes 10a vertically.

It will be apparent from the above description that I have provided a farming implement having a number of important advantages. Some of these advantages have been discussed and others will be apparent.

Having thus described my invention, what I claim is:

1. A farming implement comprising a frame, traction members for supporting said frame, means for adjusting said traction members and said frame vertically relative to each other, a plurality of tool-supporting arms carried by said frame, said arms extending longitudinally relative to the frame in laterally spaced relationship and having their forward ends pivotally connected to the frame, each of said traction members being disposed between two adjacent arms, one of said adjacent arms carrying an auxiliary tool-supporting arm which is substantially aligned with and behind said traction members.

2. A farming implement comprising a frame, traction members for supporting said frame, means for adjusting said traction members and said frame vertically relative to each other, a plurality of ground-engaging tool-supporting arms carried by said frame, each of said arms comprising a main substantially straight section having an upturned section at its forward end, all of said arms extending longitudinally of the frame and having their forward upturned sections pivotally connected adjacent their ends to said frame, said arms being disposed in laterally spaced relationship, yieldable connecting means between the frame and each arm for independently urging the rear end of each arm downwardly, said traction members being disposed between the two pairs of outermost arms at each side of the frame, one of the outermost arms of each pair being provided with an auxiliary arm which is behind the adjacent traction member in substantially the same vertical plane as said member.

FRANK B. HEMMERT.

REFERENCES CITED

The following references are of record in the file of this patent:

UNITED STATES PATENTS

| Number | Name | Date |
| --- | --- | --- |
| 219,953 | Johnson | Sept. 23, 1879 |
| 225,759 | Nelson | Mar. 23, 1880 |
| 483,501 | Richards et al. | Sept. 27, 1892 |
| 847,258 | Parenti | Mar. 12, 1907 |
| 1,251,050 | Klose | Dec. 25, 1917 |
| 1,845,887 | Ross et al. | Feb. 16, 1932 |
| 2,082,163 | Jeoffroy | June 1, 1937 |